United States Patent
Gaebler et al.

(10) Patent No.: US 10,480,340 B2
(45) Date of Patent: Nov. 19, 2019

(54) SEALING ELEMENT FOR A TURBO-MACHINE, TURBO-MACHINE COMPRISING A SEALING ELEMENT AND METHOD FOR MANUFACTURING A SEALING ELEMENT

(71) Applicant: Rolls-Royce Deutschland Ltd & Co KG, Blankenfelde-Mahlow (DE)

(72) Inventors: Miklos Gaebler, Potsdam (DE); Stephan Pannier, Nuthetal (DE); Mandy Eileen Schneider, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 513 days.

(21) Appl. No.: 15/247,247

(22) Filed: Aug. 25, 2016

(65) Prior Publication Data
US 2017/0058689 A1    Mar. 2, 2017

(30) Foreign Application Priority Data
Aug. 25, 2015   (DE) .......................... 10 2015 216 208

(51) Int. Cl.
*F01D 11/12*    (2006.01)
*F16J 15/44*    (2006.01)
(Continued)

(52) U.S. Cl.
CPC ............ *F01D 11/127* (2013.01); *F01D 11/10* (2013.01); *F01D 11/122* (2013.01);
(Continued)

(58) Field of Classification Search
CPC .... F01D 11/122; F01D 11/125; F01D 11/127; F01D 11/10; F04D 29/164; F04D 29/526; F16J 15/444; F05D 2250/283
(Continued)

(56) References Cited

U.S. PATENT DOCUMENTS 1,329,559 A * 2/1920 Tesla .......................... F15C 1/00
                                                                 137/842
3,262,635 A * 7/1966 Smuland ................. F01D 11/02
                                                                 417/355
(Continued)

FOREIGN PATENT DOCUMENTS

CN      105015047 A  * 11/2015
DE      1576956 B1     12/1971
(Continued)

OTHER PUBLICATIONS

GH Induction Atmospheres, "Types of Brazing Atmospheres" available at http://www.gh-ia.com/brazing/atmosphere-types.html as of Mar. 17, 2013. (Year: 2013).*
(Continued)

*Primary Examiner* — Richard A Edgar
*Assistant Examiner* — Topaz L. Elliott
(74) *Attorney, Agent, or Firm* — Shuttleworth & Ingersoll, PLC; Timothy J. Klima

(57) ABSTRACT

A sealing element for a turbomachine, in particular an aircraft engine, with a housing for the at least one rotating structural component is provided. The sealing element comprises a honeycomb structure for arrangement inside the housing, wherein the honeycomb structure extends in a first direction, wherein support structures are connected to the honeycomb structure in one piece and/or in a pattern-like manner and extend at least partially into the honeycomb structure, and the support structures extend at least partially or completely in a second direction that is different from the first direction. The support structures have planar portions, which are formed by at least one partially or completely closed cell together with the honeycomb structure.

17 Claims, 4 Drawing Sheets

(51) Int. Cl.
  *F04D 29/16* (2006.01)
  *F04D 29/52* (2006.01)
  *F01D 11/10* (2006.01)
(52) U.S. Cl.
  CPC ......... *F04D 29/164* (2013.01); *F04D 29/526* (2013.01); *F16J 15/444* (2013.01); *F05D 2220/323* (2013.01); *F05D 2250/11* (2013.01); *F05D 2250/121* (2013.01); *F05D 2250/131* (2013.01); *F05D 2250/132* (2013.01); *F05D 2250/141* (2013.01); *F05D 2250/283* (2013.01)
(58) Field of Classification Search
  USPC .......................................................... 277/414
  See application file for complete search history.

(56) References Cited

U.S. PATENT DOCUMENTS

| | | | |
|---|---|---|---|
| 3,529,905 A | 9/1970 | Meginnis | |
| 3,584,972 A * | 6/1971 | Bratkovich | B21D 53/78 29/889.721 |
| 3,649,033 A | 3/1972 | Kondo | |
| 3,844,011 A | 10/1974 | Davies | |
| 5,282,718 A * | 2/1994 | Koff | F01D 11/08 415/57.3 |
| 6,251,494 B1 * | 6/2001 | Schreiber | F01D 11/127 228/181 |
| 6,499,944 B1 * | 12/2002 | Beeck | F01D 11/127 415/173.3 |
| 6,814,541 B2 * | 11/2004 | Evans | B29C 33/40 415/200 |
| 7,510,052 B2 * | 3/2009 | Ayle | F02C 7/045 181/213 |
| 8,052,375 B2 * | 11/2011 | Turnquist | F01D 11/04 415/57.4 |
| 8,550,774 B2 * | 10/2013 | Maltson | F01D 5/225 415/116 |
| 9,816,388 B1 * | 11/2017 | Kirtley | F16J 15/447 |
| 2001/0004436 A1 | 6/2001 | Chasripoor et al. | |
| 2004/0265120 A1 | 12/2004 | Tuffs et al. | |
| 2006/0131815 A1 | 6/2006 | Meier et al. | |
| 2009/0148278 A1 | 6/2009 | Allen | |
| 2016/0215646 A1 * | 7/2016 | Gonyou | F01D 11/025 |
| 2016/0325520 A1 * | 11/2016 | Berger | B32B 3/12 |
| 2016/0327064 A1 * | 11/2016 | Logue | F01D 25/162 |
| 2017/0072588 A1 * | 3/2017 | Sakashita | B33Y 10/00 |

FOREIGN PATENT DOCUMENTS

| | | |
|---|---|---|
| DE | 10259963 A1 | 7/2004 |
| DE | 102004057360 A1 | 6/2006 |
| DE | 60319797 T2 | 4/2009 |
| DE | 102010062087 A1 | 5/2012 |
| EP | 0081010 A2 | 6/1983 |
| GB | 2001692 A | 2/1979 |
| WO | 2012072384 A1 | 6/2012 |

OTHER PUBLICATIONS

Koch, Wolfgang, "Argon fire extinguisher systems—the simple solution" available from https://www.nist.gov/sites/default/files/documents/el/fire_research/R0000257.pdf (Year: 2018).*
German Search Report dated Jun. 1, 2015 from counterpart German App No. 10 2015 216 208.7.
European Search Report dated Jan. 24, 2017 for counterpart European Application No. 16183862.8.

* cited by examiner

SEALING ELEMENT FOR A TURBO-MACHINE, TURBO-MACHINE COMPRISING A SEALING ELEMENT AND METHOD FOR MANUFACTURING A SEALING ELEMENT

REFERENCE TO RELATED APPLICATION

This application claims priority to German Patent Application DE102015216208.7 filed Aug. 25, 2015, the entirety of which is incorporated by reference herein.

BACKGROUND

The invention relates to a sealing element and a turbomachine as well as a method for manufacturing a sealing element.

In turbomachines, such as for example aircraft engines, it is necessary to provide seals between the housing of rotating structural components, such as for example rotors or rotating sealing lips (web seals). Abrasive Inlet seals for aircraft engines are for example known from U.S. Pat. No. 3,844,011 A or DE 10 2004 057 360 B4. Here, honeycomb structures are used, for example.

SUMMARY

The given objective is to create sealing elements that provide an abrasive seal in a targeted and efficient manner.

The objective is achieved by a sealing element as described herein.

Here, the sealing element has a honeycomb structure for arrangement inside the housing of the turbomachine. At that, the honeycomb structure extends in a first direction, wherein support structures are connected to the honeycomb structure in one piece and/or in recurring patterns, extending at least partially into the honeycomb structure. What is meant by a recurring pattern here is a sequence of regularly formed support structures that are connected in a regular pattern (such as a grid, for example) to the honeycomb structure.

The support structures extend at least partially or completely in a second direction that is different from the first direction. Thus, the sealing element has two structures: the honeycomb structure and the support structures connected thereto. At that, the support structures are at least partially oriented in a different direction than the honeycomb structure. In this way, the sealing element is provided with a structure that has a defined stability and can be adjusted to a given case of abrasive deformation.

The support structures have planar portions that are formed by at least one partial or closed cell, in particular fluid-tight cells, together with the honeycomb structure. The planar portions can for example be present in the form of intermediate walls that are arranged inside the individual honeycombs of the honeycomb structure. The intermediate walls of the support structures can form the closed cell, wherein the at least one closed cell is filled particularly at least partially with an extinguishing agent and/or air. Through the at least one closed cell, the undesired solder flux (capillary action) can be avoided, for example. Also, at least one cell that is filled with gas (e.g. with air) serves for thermal insulation.

In one embodiment, the honeycomb structure and/or the support structures can be abrasively modified in the event that contact with at least one rotating structural component (e.g. a rotating sealing lip) occurs. In this manner, a reduction of the friction surfaces can be achieved.

In one embodiment, the first direction, into which the honeycomb structure extends, extends so as to be substantially perpendicular to the housing of the turbomachine. The honeycombs of the honeycomb structure are thus aligned in the radial direction. In a further embodiment, the second direction, in which the support structures are arranged, lies mostly perpendicularly to the first direction of the honeycomb structure.

Here, the embodiments of the honeycombs of the honeycomb structure can have a circular, square, rectangular, triangular, hexagonal, rhombic or polygonal cross-section.

In a further embodiment of the sealing element, the honeycomb structures have a rhombic cross-section, wherein the acute angle of the cross-section lies perpendicularly to the rotational plane of the rotating structural component (e.g. rotor, web seal), with the acute angle comprising less than 90°, particularly less than 60°, very particularly between 60° and 30°. Thus, the long axis of the rhombic cross-section lies inside or in parallel to the rotational plane of the rotor. With a rotating sealing lip (web seal), the angular orientation inside the honeycomb structure is determined by the smallest possible leakage cross-section between the sealing lip and the honeycomb structure.

The sealing effect of the sealing element is improved by arranging the support structures in such a manner that they are respectively offset in the first direction at the honeycombs of the honeycomb structure. In this way, it is for example possible to form one or multiple closed cells in the honeycombs at different heights.

In one embodiment, the honeycomb structure and/or the support structures have a thickness, in particular a wall thickness, of less than 100 µm, in particular less than 80 µm.

In order to ensure a sufficient temperature stability, the honeycomb structure and/or the support structures consist of a metallic material, in particular from the FeCrAlxx group or the Ni-based group of alloys, wherein the honeycomb structure and the support structures are particularly constructed from the same material. If the honeycomb structure and the support structures are constructed in one piece from the same material, the sealing element can be manufactured in a particularly efficient manner. Possible materials are for example Inco718 or Fe20Cr6AlY with a D90<10 µm. With such materials, it is possible to achieve an abrasive behavior of the honeycomb structure (such as a targeted brittleness, for example) and/or of the support structures in a targeted manner.

In order to ensure a flexible adjustment to the respective seal task, in one embodiment the honeycomb structure and/or the support structures have a variable density, structure and/or shape in the sealing element. Thus, the cross-sectional sizes of the honeycombs can be adjusted to the task at hand, for example. Thus, the honeycombs can for example be configured so as to be larger in the middle of the sealing element than at its edge. In principle, an adjustment to the respective application is thus possible. The sealing element can also be optimized, wherein larger honeycombs are used for a reduced heat development during run-up, for example. For an improvement of the sealing effect, smaller clearances and smaller cells are required.

In one embodiment, the honeycomb structure, due to the support structures, has a means for retaining solder in order to avoid any damage to the rotor blades. Solder is often used during mounting of sealing elements, wherein an uncontrolled diffusion of solder to the surface of the sealing element is undesirable. With one embodiment, it can be avoided that solder rises to the surface of the honeycomb structure. In this manner, any undesired bulging of the honeycomb structure is prevented. Hence, in the present invention, a small separate honeycomb chamber is formed with the help of the support structures, for example, so that the solder will remain inside the lowest honeycomb chamber.

In one embodiment, the honeycomb structure is coupled to a fluidic valve means for improving the sealing characteristics. A fluidic valve means, such as e.g. a Tesla valve, is a passive fluidic structural element, in which the flow resistance is much higher in one direction than in the opposite direction. In this manner, a type of rectifier effect can be achieved.

The objective is also achieved by a sealing element as described herein, wherein the honeycomb structure and/or the support structures can be manufactured by means of a metallic 3D screen print or a metallic 3D printing process. At that, a metallic powder, in particular with a D90 value (i.e. with 90% of the particles lying below) of less than 10 μm, can be used in the manufacture.

In a 3D screen print, the sealing element with the honeycomb structure and/or structures is dissected into planes, for example, wherein a screening tool is used for each plane. The first plane is printed onto a base, is subsequently cured and printed again on top of the previous print with positional accuracy until the first structure plane has reached its target height. Subsequently, the next structure plane is printed on, with these steps being repeated.

The objective is also achieved by means of a turbomachine, in particular an aircraft engine, with a sealing element as described herein.

The objective is also achieved by means of method for manufacturing a sealing element as described herein.

Here, a honeycomb structure for arrangement inside the housing of the turbomachine and support structures is manufactured at least partially by means of a metallic 3D screen print or a metallic 3D printing process, wherein the honeycomb structure extends in a first direction and the support structures are connected to the honeycomb structure at least partially in one piece and/or in recurring patterns, the support structures extend at least partially into the honeycomb structure, and the support structures extend at least partially or completely in a second direction that is different from the first direction, wherein the support structures have planar portions, which are formed by at least one partially or completely closed cell together with the honeycomb structure.

BRIEF DESCRIPTION OF THE DRAWINGS

The invention is explained in connection with the exemplary embodiments that are shown in the Figures.

DETAILED DESCRIPTION

Figure 1:
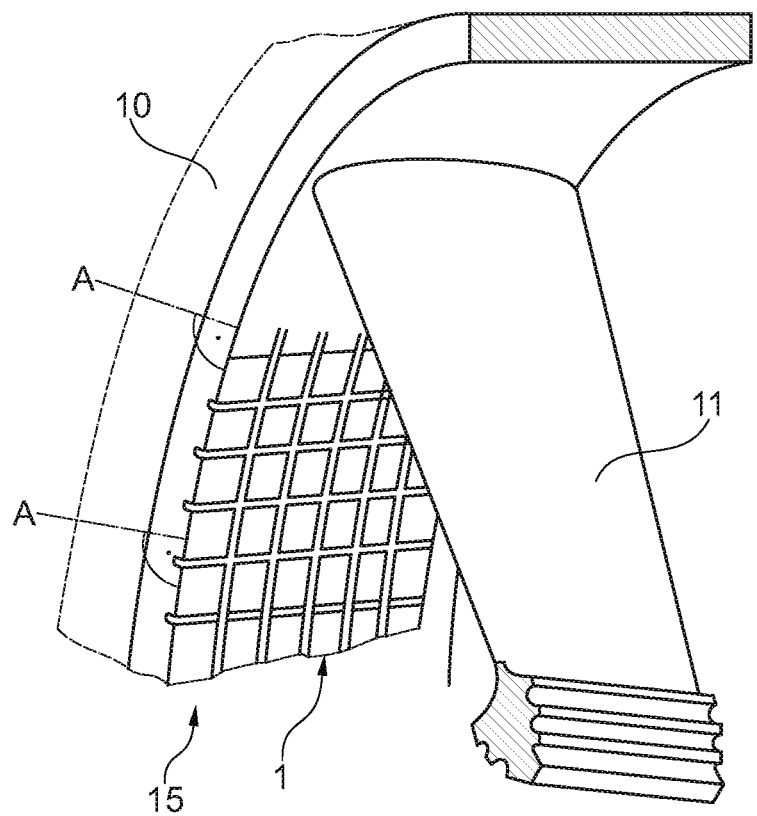
FIG. 1 shows a schematic rendering of a housing and of a rotor of a turbomachine with a sealing element.

FIG. 1 shows a section of a turbomachine, namely an aircraft engine, in a schematic manner. Here, a housing 10 surrounds a rotating structural component, in the present case a rotor, of which only one rotor blade 11 is shown here. Such rotor blades 11 are arranged inside compressors and/or turbines of an aircraft engine, for example.

A honeycomb structure 1 of a sealing element 15 is arranged in a per se known manner at the inner side of the housing 10. Here, the honeycombs of the honeycomb structure 1 have a square cross-section. The individual honeycombs of the honeycomb structure 1 have walls that are arranged substantially perpendicular to the housing 10. In FIG. 1, this perpendicular direction A is drawn in in two places. In the following, such embodiments of sealing elements 15 are described which, in addition to the honeycomb structure 1, also have support structures 2, which are not shown in FIG. 1 for reasons of clarity.

Figure 2:
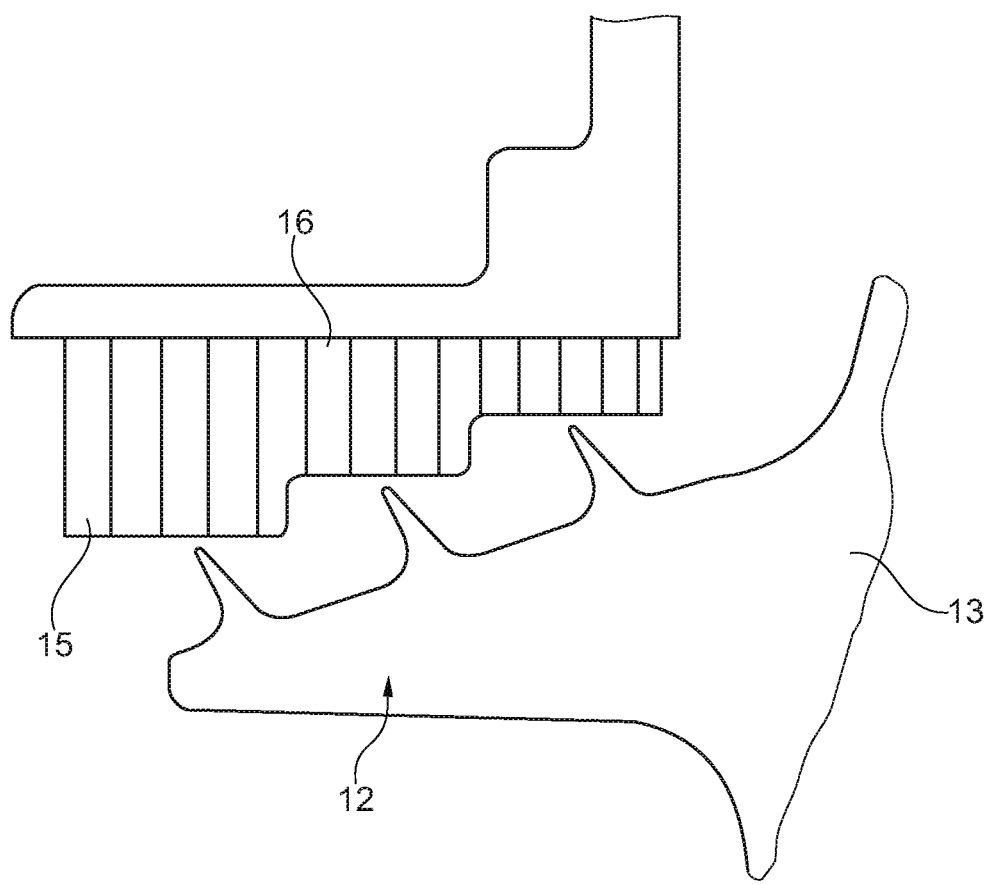
FIG. 2 shows a schematic sectional view through a rotating sealing lip (web seal).

FIG. 2 shows another rotating structural component in one section, namely a rotating sealing lip 12 with three individual circumferential sealing lips, as they may for example be arranged at a rotor 13 of a turbine stage. The sealing lip 12 meshes with the circumferential sealing element 15 at a stator 16. The honeycomb structure 1 and the support structures 2 are not shown here for reasons of clarity.

During the touching or the run-in of rotating structural components, such as rotor blades 11 (FIG. 1) or the sealing lip 12 (FIG. 2), into the sealing element 15, the honeycomb structure 1 that is not shown in FIGS. 1 and 2 and also the support structures 2 are in particular abrasively ablated. Through the stepped design/construction of the sealing element 15 as well as through the arrangement of multiple sealing lips, a labyrinth seal is constructed for the gap between the rotor blades 11 or the sealing lip 12 and the housing 10.

Principally, a sealing element 15 can also be used with other rotating structural components of a turbomachine.

Figure 3:
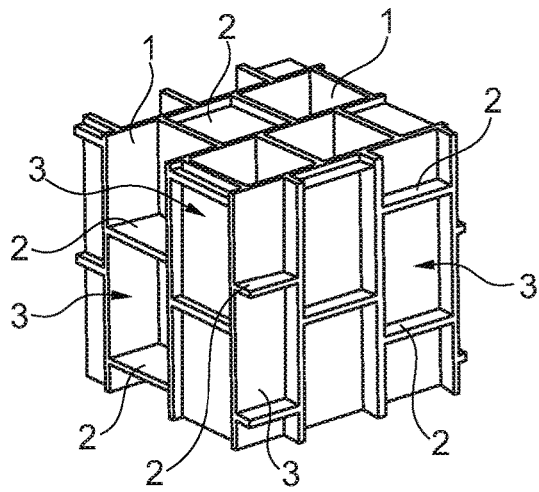
FIG. 3 shows a three-dimensional view of an embodiment of a sealing element having a honeycomb structure with a square cross-section and horizontal support structures.

FIG. 3 shows a three-dimensional section of a sealing element 15. Here, the honeycombs of the honeycomb structure 1 have a square cross-section, respectively. The walls of the honeycomb structure 1 are oriented in the first direction A, being oriented substantially perpendicularly to the wall of the housing 10 in the case of FIG. 1. Thus, they point in the radial direction, that is, the same direction into which the rotor blades 11 extend (see FIG. 1). Since the wall of the housing 10 is bent, the direction of the honeycomb walls changes.

Figure 7:
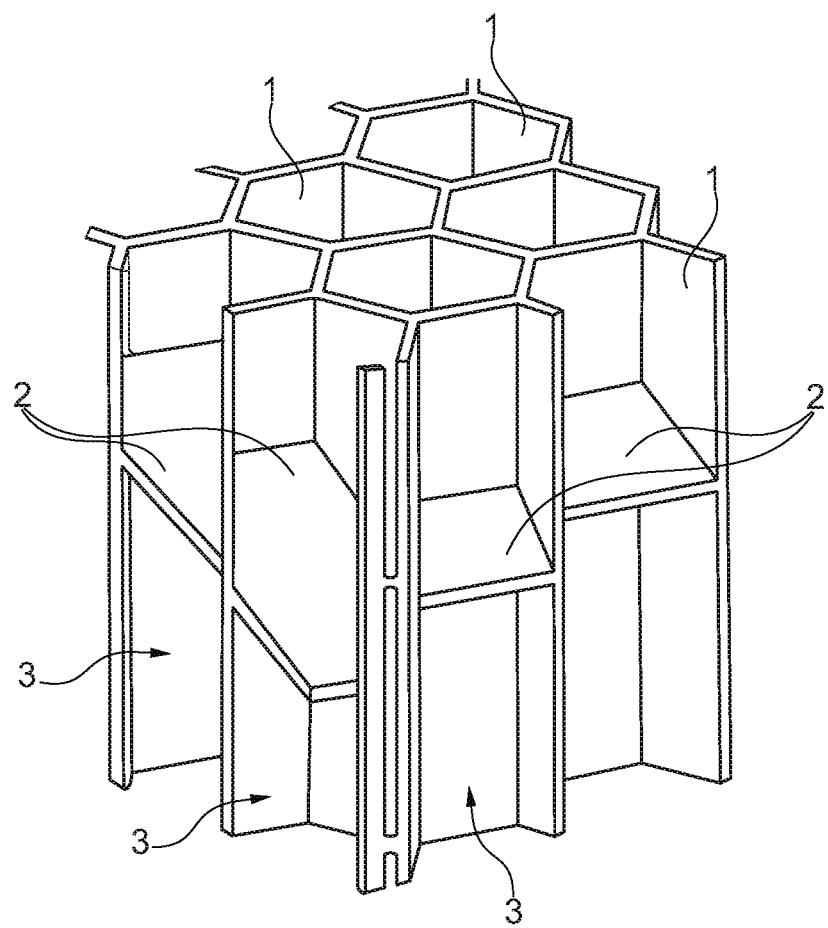
FIG. 7 shows a three-dimensional view of an embodiment of a sealing element with a honeycomb structure having a hexagonal cross-section and tilted support structures.

In the front and at the left side of the section in FIG. 3, the honeycombs of the honeycomb structure 1 are respectively cut open, so that the support structures 2 can be seen. The support structures 2 are formed as flat surfaces here, which are configured so as to be substantially perpendicular to the walls of the honeycomb structures 1. Thus, the support structures 2 are oriented in a second direction B that is different from the first direction A. In the shown embodiment, the two directions A, B are arranged perpendicularly to one another. FIG. 7 shows an embodiment in which the directions A, B are not oriented in a perpendicular manner.

Here, the support structures 2 are formed as planar constructs, forming closed cells 3 inside the individual honeycombs of the honeycomb structure 1. Principally, a partially or completely closed cell 3 is sufficient, as well.

As can for example be seen from the cut-open front side of FIG. 2, the support structures 2 are respectively arranged at different heights (as measured in the first direction A, for example) inside the honeycombs of the honeycomb structure 1; that is, the support structures are arranged in an offset manner, so that closed cells 3 having different height levels are created along the individual honeycombs. The closed cells 3 can be filled with a fluid, such as a gas or an extinguishing agent/powder.

As can be seen in FIG. 3, the support structures 2 form a regular pattern, namely a grid of identical cells. They can be manufactured in one piece with the honeycomb structure 1, for example.

If a rotor blade 11 (see FIG. 1) or a sealing lip 12 (see FIG. 2) penetrates the honeycomb structure 1 during run-in, some walls of the honeycombs and consequently also the closed cells 3 are deformed in an abrasive manner up to a certain depth. If the material is chosen so as to be sufficiently brittle, the walls of the honeycomb structure 1 and the support elements 2 fall apart relatively easily, so that the abrasive effect can occur in an easy manner.

Those closed cells 3 which are arranged deeper inside the sealing element 15 (that is, which are arranged radially further to the outside as viewed from the rotational axis) remain intact, so that a good sealing effect can continued to be ensured. The sealing effect is improved by means of the support structures 2 that are arranged so as to be offset in a dissimilar manner—and thus by means of the closed cells 3 that are arranged so as to be offset in a dissimilar manner.

The complex three-dimensional structure of the sealing element 15 is created from a metallic powder by means of a 3D screen print or a 3D printing method. Here, the powder may for example have a D90 grain size of less than 10 μm (i.e. fine dust), which is manufactured by means of gas or water atomization.

Thanks to this method, it is possible to manufacture complex three-dimensional structures in an efficient manner. At that, it is also possible that the size, orientation and/or 3D shape of the honeycomb structure 1 and/or of the support structures 2 varies within the sealing element 15. As will be shown in the following, the orientation of the walls of the honeycombs and/or the orientation of the support structures 2 can contribute to minimizing the frictional contact surface.

The wall thicknesses of the honeycomb structure 1 and of the support structures 2 may for example be less than 100 μm. If for example a metal from the FeCrAlY group is used for the honeycomb structure 1 and the support structures 2, a sealing element 15 is created that is abrasively deformable to a sufficient degree, while at the same time being high-temperature resistant.

Figure 4:
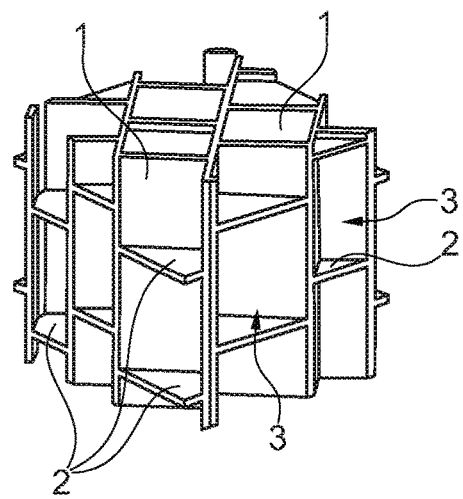
FIG. 4 shows a three-dimensional view of an embodiment of a sealing element with a honeycomb structure having a square cross-section in an oblique arrangement and horizontal support structures.
Figure 5:
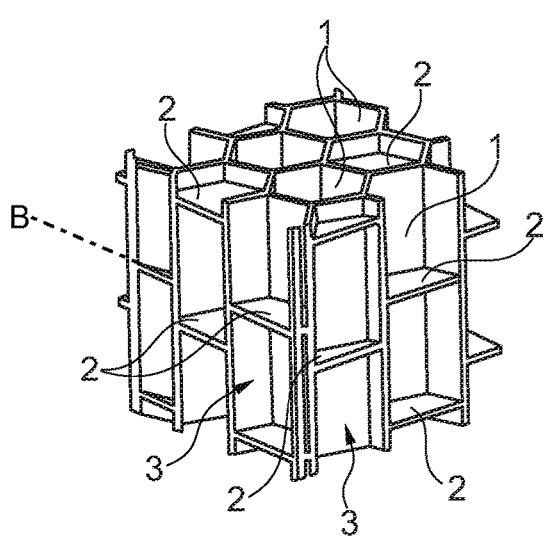
FIG. 5 shows a three-dimensional view of an embodiment of a sealing element with a honeycomb structure having a hexagonal cross-section and horizontal support structures.
Figure 6:
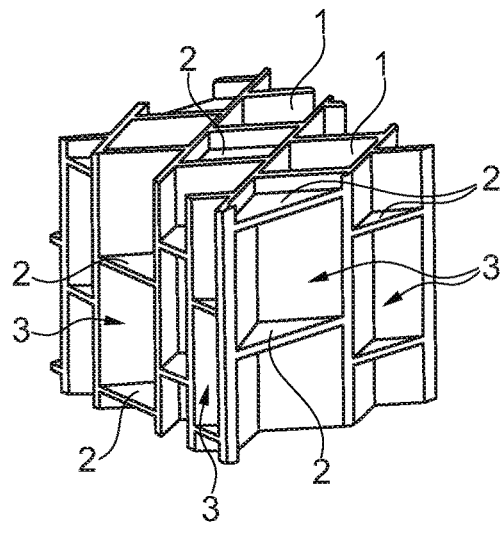
FIG. 6 shows a three-dimensional view of an embodiment of a sealing element with a honeycomb structure having a rhombic cross-section and horizontal support structures.

In FIGS. 4 to 6, variations of the embodiment according to FIG. 3 are shown, so that it may be referred to the above description. Here, too, the support structures 2 form regular patterns, that is, they are connected in a pattern-like manner to the honeycomb structure 1.

The design of the honeycomb structure 1 as well as the arrangement of the support structures 2 as planar constructs for forming closed cells 3 inside the honeycomb structure 1 is identical. Also, in this case the planar support structures 2 are likewise arranged perpendicularly to the walls of the honeycomb structure 1, that is, the first direction A is arranged substantially perpendicular to the second direction B.

In FIG. 4, the honeycomb structure 1 is also formed out of honeycombs with a square cross-section. But the orientation of the honeycombs is rotated by 45°.

In FIG. 5, the honeycombs of the honeycomb structure 1 have a hexagonal cross-section, as in a per se known honeycomb structure.

FIG. 6 shows an embodiment in which the honeycombs of the honeycomb structure 1 have a rhombic cross-section. As is shown in connection with FIG. 7, this can be advantageous if the sealing element 15—and thus the shape of the honeycombs—is directed towards the rotor's rotational plane R.

FIG. 7 shows a schematic top view of a rhombic honeycomb of a honeycomb structure 1, as it is shown in FIG. 6, for example. Here, the acute angle α is aligned perpendicularly towards the rotational plane of the rotor 11 or the sealing lip 12, which extends perpendicularly to the drawing plane and is indicated by the dashed line R. Through the angle α, the weighting between the sealing effect and the minimal friction surface can be controlled in the course of the designing process.

Figure 8:
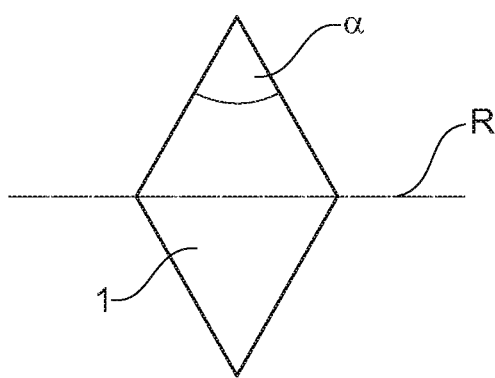
FIG. 8 shows a detailed view of a honeycomb structure with a rhombic cross-section.

While in FIGS. 3 to 6 the planar support structures 2 are respectively embodied so as to be substantially perpendicular to the walls of the honeycombs, FIG. 8 shows an embodiment in which the planar support structures 2 are formed so as to be tilted with respect to the horizontal line, that is, the directions A, B are no longer arranged so as to be perpendicular to one another.

A possible modification of all the shown embodiments consists in the feature that the support structures 2 do not completely close the honeycombs of the honeycomb structure 1. In this way, they would influence the mechanical behavior, but no closed cells 3 would be created. It is also possible that closed cells are formed only in some parts of the sealing element 15. Here, the flexible manufacturing methods allow for a wide range of different 3D structures. Thus, the support structures 2 do not have to be formed in a planar manner, but they can also be bar-shaped or netlike, for example.

Further, it is possible that embodiments of the sealing element 15 have a honeycomb structure 1 with different honeycomb shapes and/or dimensions. For example, a central area of the sealing element 15 can have a different wall density (a different honeycomb size, a different honeycomb shape, a different support structure, for example) than an area of the sealing element that is located at the edge. Here, the flexible manufacturing methods facilitate an adjustment to the sealing effect to be achieved.

The honeycombs of the honeycomb structure 1 can also have a circular, polygonal, triangular or generally polygonal cross-section, for example.

PARTS LIST 1 honeycomb structure
2 support structures
3 closed cells
10 housing
11 rotor blade
12 sealing lip
13 rotor
15 sealing element
16 stator A first direction of the honeycomb structure (perpendicular to a rotor housing)
B second direction
R rotational plane of the rotor
α angle of a rhombic honeycomb

The invention claimed is:
1. A sealing element for a turbomachine, comprising:
a honeycomb structure arranged inside a housing for a rotating structural component, wherein the honeycomb structure includes:
a plurality of honeycomb walls, wherein the plurality of honeycomb walls are linear, and the plurality of honeycomb walls extend continuously from an inner circumference of the sealing element to an outer circumference of the sealing element, wherein the inner circumference of the sealing element is a radially innermost portion of the sealing element facing the rotating structural component and the outer circumference of the sealing element is a radially outermost portion of the sealing element closest to the housing for the rotating structural component;
a plurality of cells, wherein each of the plurality of cells includes portions of a certain number of the plurality of honeycomb walls;
a plurality of support structures formed as transverse walls connected to the plurality of honeycomb walls, wherein the transverse walls are positioned between inner and outer circumferences of the honeycomb structure, wherein the plurality of support structures includes a plurality of inner support structures and a plurality of outer support structures which define radially inner and outer boundaries of the plurality of cells, respectively; and
wherein each of cell of the plurality of cells has a radially inner boundary with respect to a radial direction of the rotating structural component, wherein the radially inner boundary is defined by an inner support structure, and wherein each cell of the plurality of cells further comprises a radially innermost point of the radially inner boundary; wherein the radially innermost point of a first cell of the plurality of cells is offset in a radial direction from the radially innermost point of an adjacent second cell of the plurality of cells, and wherein the adjacent second cell is at least one chosen from axially or circumferentially adjacent to the first cell; and
wherein the first cell is a closed, fluid-tight cell.

2. The sealing element according to claim 1, wherein the plurality of honeycomb walls extend in a radially inward direction from the housing.

3. The sealing element according to claim 1, wherein the plurality of support structures are arranged in a direction perpendicular to the plurality of honeycomb walls.

4. The sealing element according to claim 1, wherein an interior space of one of the plurality of cells is filled at least partially with an extinguishing agent or air.

5. The sealing element according to claim 1, wherein the certain number of the plurality of honeycomb walls is chosen from four, five, six, seven or eight; and
wherein one of the plurality of cells has a cross-sectional shape that is chosen from square, rectangular, triangular, hexagonal, rhombic or polygonal.

6. The sealing element according to claim 1, wherein one of the plurality of cells has a rhombic cross-sectional shape, the rhombic cross-sectional shape having an acute angle, wherein a longer diagonal of the rhombic cross-sectional shape is parallel to a center axis of the rotating structural component, and the acute angle is less than 60°.

7. The sealing element according to claim 6, wherein the acute angle is between 30° and 60°.

8. The sealing element according to claim 7, wherein the sealing element is constructed from a metallic powder with a grain size D90 of less than 10 μm.

9. The sealing element according to claim 1, wherein the honeycomb structure has a wall thickness of less than 100 μm.

10. The sealing element according to claim 1, wherein the honeycomb structure is made of a metallic material from the FeCrAlxx group or the Ni-based group of alloys.

11. The sealing element according to claim 1, wherein the honeycomb structure has at least one chosen from a variable density, a variable structure and a variable shape.

12. The sealing element according to claim 1, wherein certain of the plurality of cells are located at a mounting surface of the sealing element to retain solder.

13. An aircraft engine, including the sealing element according to claim 1.

14. The sealing element according to claim 1, wherein the each cell of the plurality of cells further comprises:
a radially outer boundary wherein the radially outer boundary is at least one chosen from an outer support structure and the outer circumference of the sealing element, and
a plurality of cell heights wherein a cell height is measured by a radial distance between the radially inner boundary and the radially outer boundary with respect to with respect to the radial direction of the rotating structural component, and wherein a cell height of the first cell of the plurality of cells is different from a cell height of the second adjacent cell.

15. The sealing element according to claim 1, wherein each of the plurality of honeycomb walls is planar and extends continuously from an inner circumference of the sealing element to an outer circumference of the sealing element.

16. A sealing element according to claim 1, wherein certain of the plurality of cells are spaced radially adjacent to one another.

17. A method for manufacturing a sealing element for a turbomachine, comprising:
printing a honeycomb structure using a metallic 3D printing process, for arrangement inside a housing for a rotating structural component, including:
printing a plurality of honeycomb walls, wherein the plurality of honeycomb walls are linear, and the plurality of honeycomb walls extend continuously and radially from an inner circumference of the sealing element to an outer circumference of the sealing element, wherein the inner circumference of the sealing element is a radially innermost portion of the sealing element facing the rotating structural component and the outer circumference of the sealing element is a radially outermost portion of the sealing element closest to the housing for the rotating structural component;
wherein the printing of the plurality of honeycomb walls forms a plurality of cells, wherein each of the plurality of cells includes portions of a certain number of the plurality of honeycomb walls;
printing a plurality of support structures formed as transverse walls connected to the plurality of honeycomb walls, wherein the transverse walls are positioned between inner and outer circumferences of the honeycomb structure, wherein the plurality of support structures includes:
a plurality of inner support structures and a plurality of outer support structures which define radially inner and outer boundaries of the plurality of cells, respectively;
wherein each cell of the plurality of cells has a radially inner boundary with respect to a radial direction of the rotating structural component, wherein the radially inner boundary is defined by an inner support structure; and
wherein each of cell of the plurality of cells further comprises a radially innermost point of the radially inner boundary, wherein the radially innermost point of a first cell of the plurality of cells is offset in a radial direction from the radially innermost point of an adjacent second cell of the plurality of cells, and wherein the adjacent second cell is one at least one chosen from axially or circumferentially adjacent to the first cell; and
wherein the first cell is a closed, fluid-tight cell.

\* \* \* \* \*